Figure 13:
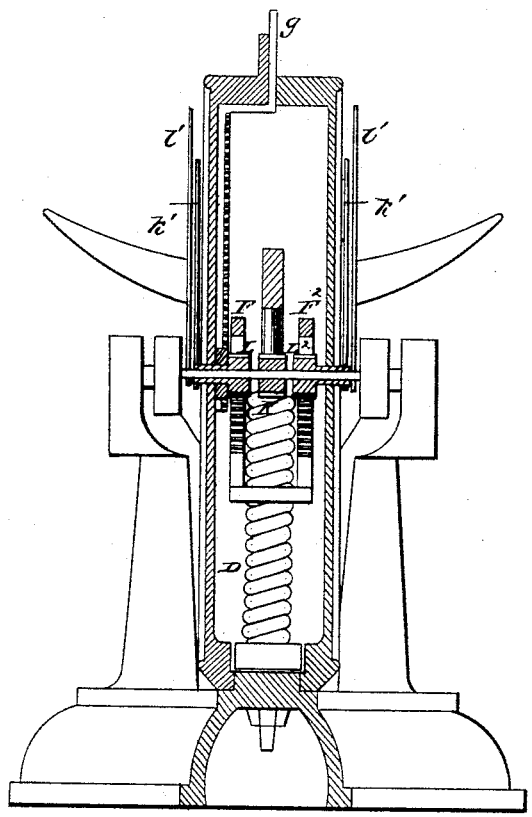

(No Model.) 6 Sheets—Sheet 1.
J. W. CULMER.
WEIGHING AND PRICE SCALE.
No. 448,911. Patented Mar. 24, 1891.
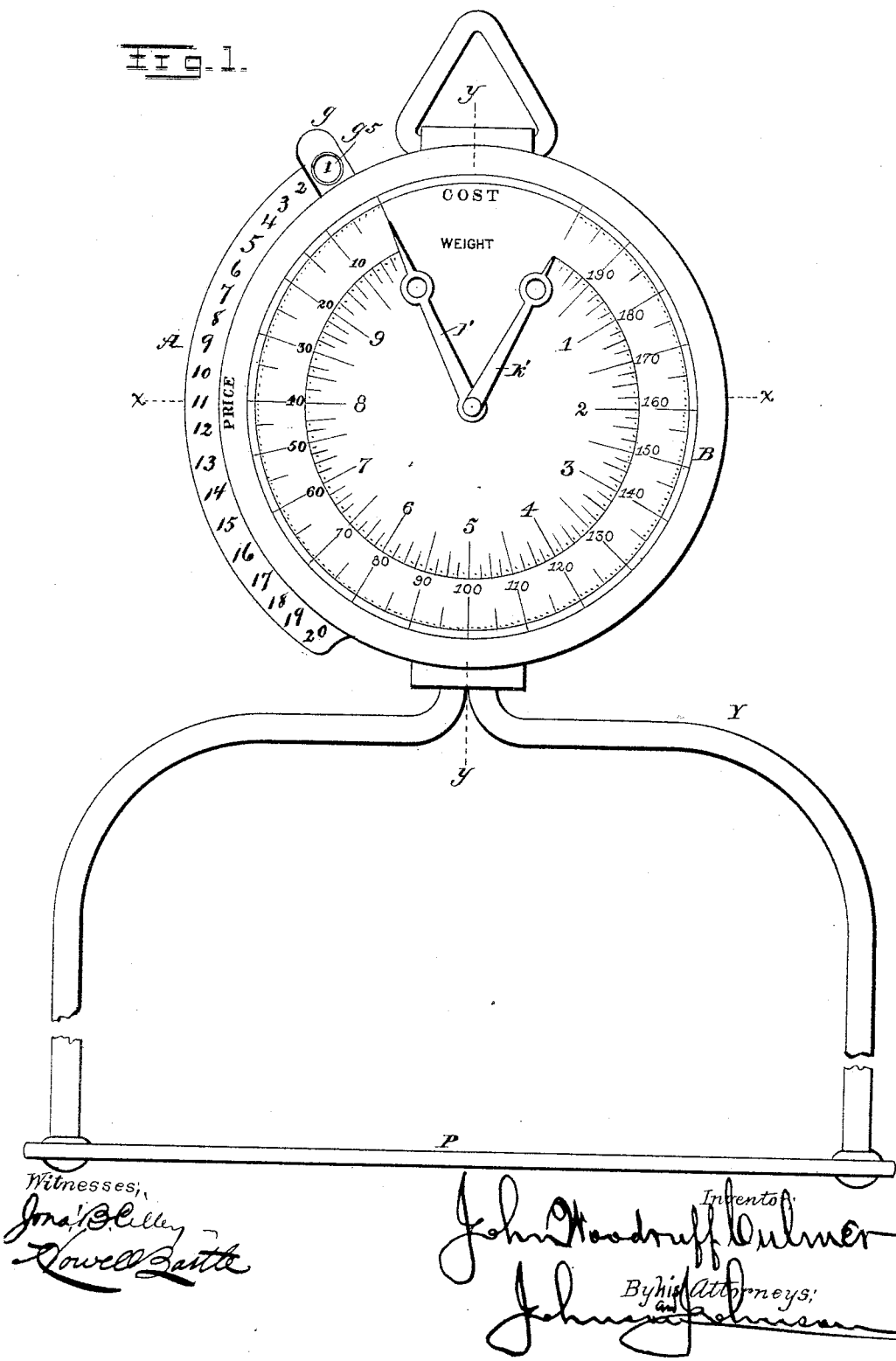

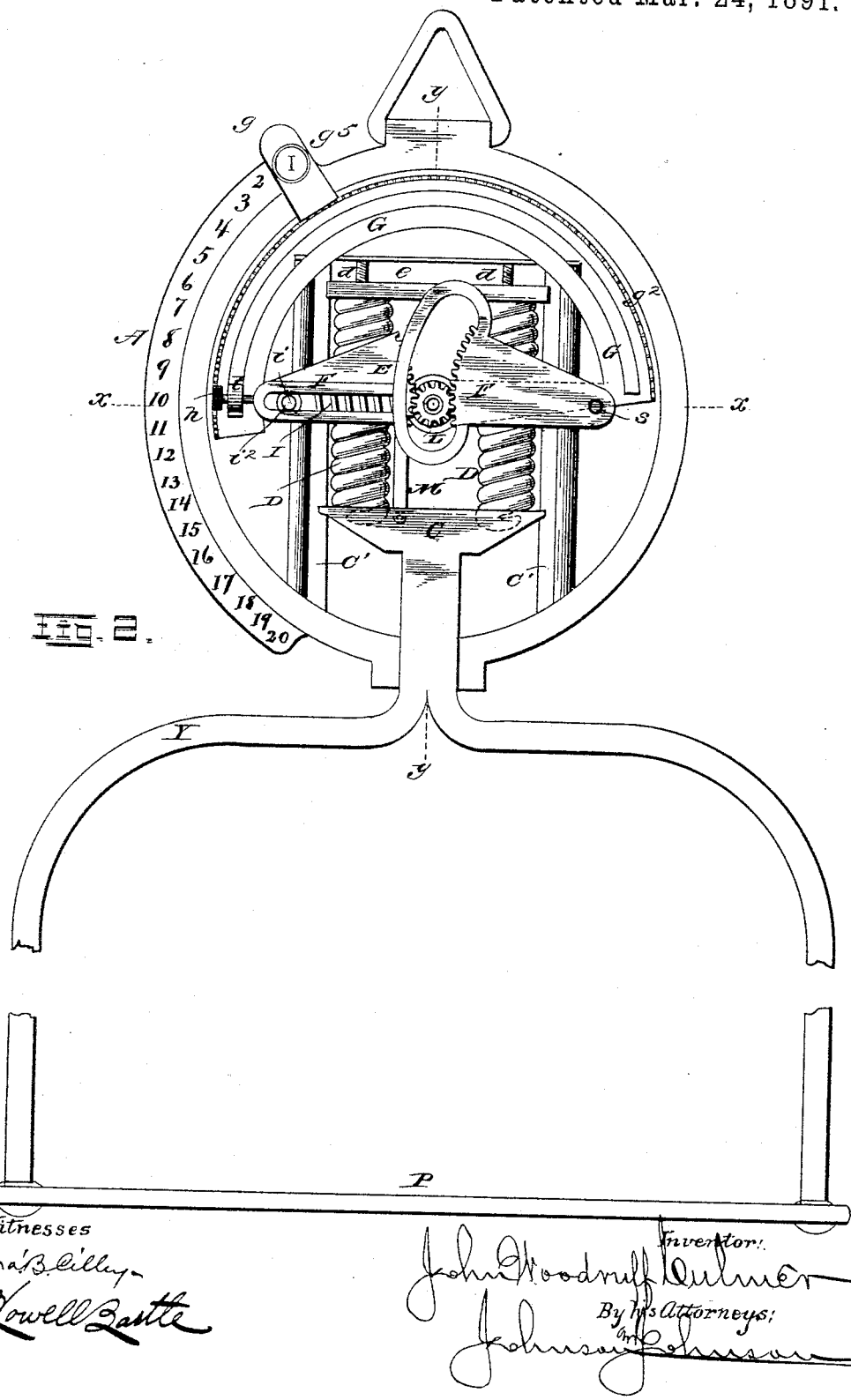

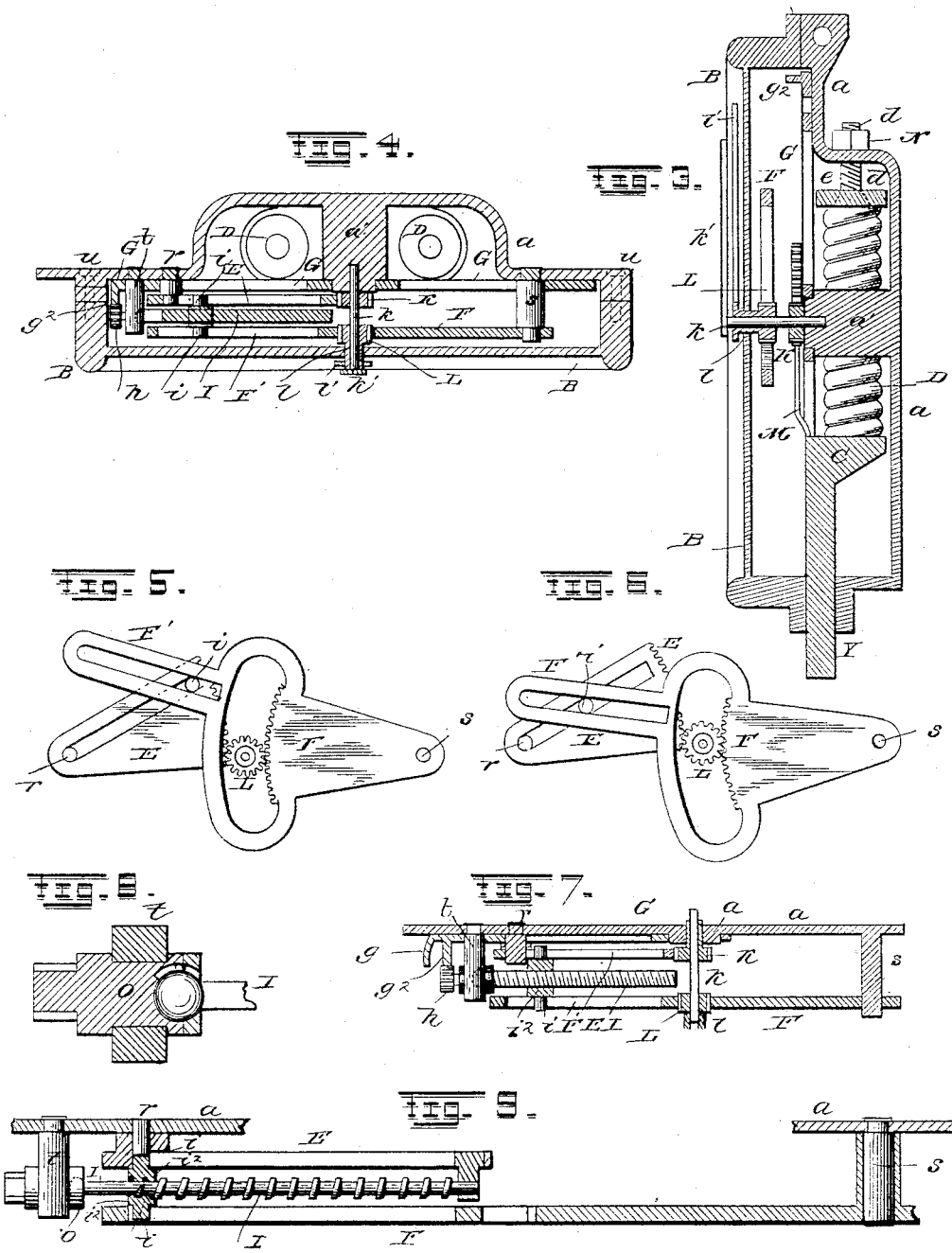

(No Model.) 6 Sheets—Sheet 4.
J. W. CULMER.
WEIGHING AND PRICE SCALE.
No. 448,911. Patented Mar. 24, 1891.
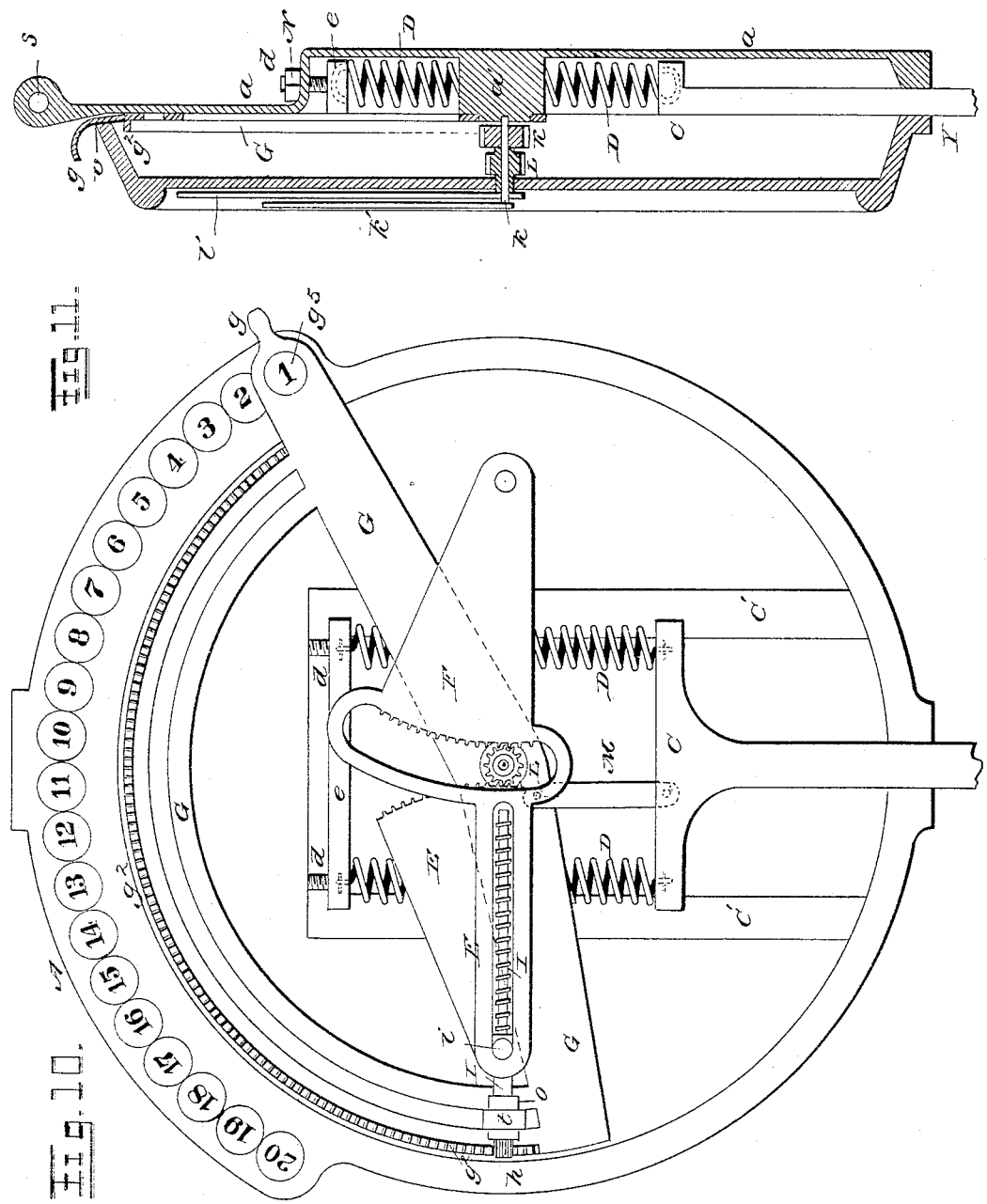

(No Model.) 6 Sheets—Sheet 5.
J. W. CULMER.
WEIGHING AND PRICE SCALE.
No. 448,911. Patented Mar. 24, 1891.
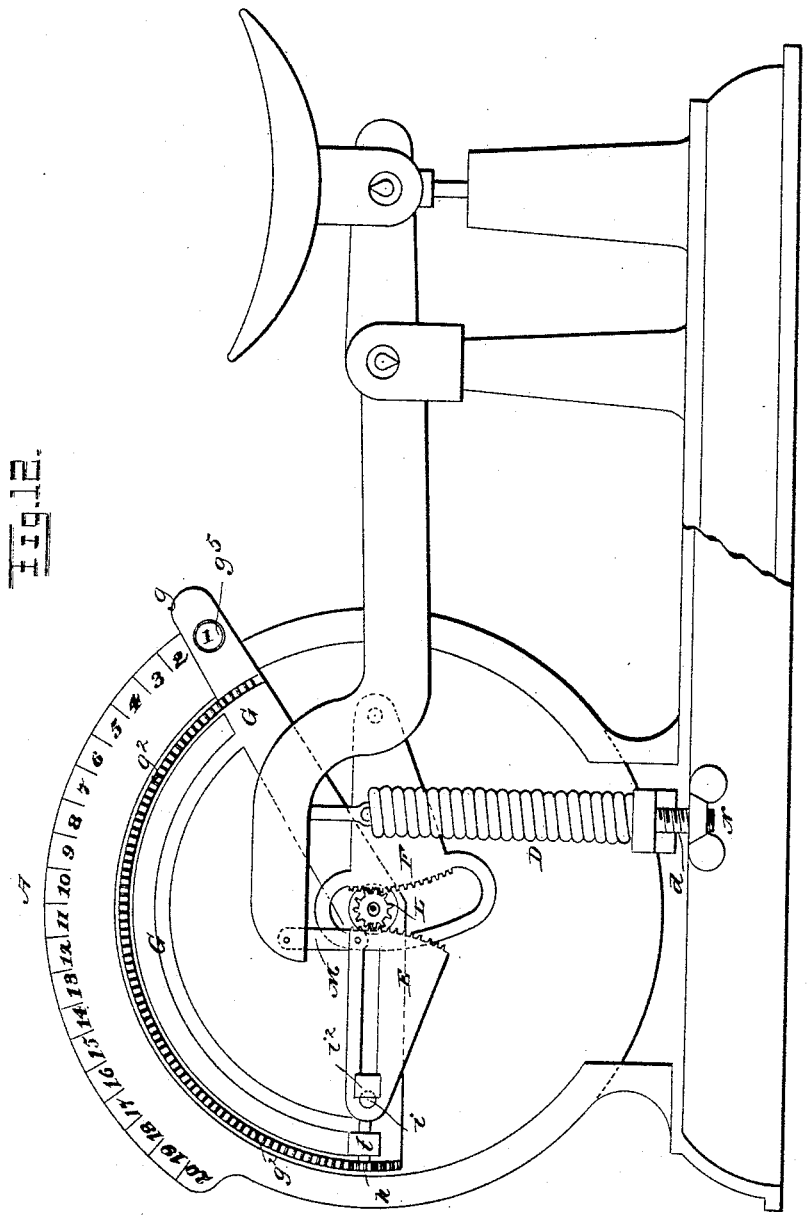

(No Model.) 6 Sheets—Sheet 6.

J. W. CULMER.
WEIGHING AND PRICE SCALE.

No. 448,911. Patented Mar. 24, 1891.

UNITED STATES PATENT OFFICE.

JOHN WOODRUFF CULMER, OF NEW BRIGHTON, PENNSYLVANIA.

WEIGHING AND PRICE SCALE.

SPECIFICATION forming part of Letters Patent No. 448,911, dated March 24, 1891.

Application filed September 5, 1890. Serial No. 364,029. (No model.)

*To all whom it may concern:*

Be it known that I, JOHN WOODRUFF CULMER, a citizen of the United States, residing at New Brighton, in the county of Beaver and State of Pennsylvania, have invented new and useful Improvements in Weighing and Price Scales, of which the following is a specification.

My invention relates to scales for weighing and for indicating the price of the article per pound and of its total cost; and my invention consists of certain novel parts and combinations of parts, the separate features of which will be separately and specifically pointed out in the claims concluding this specification, reference being had to the annexed drawings, which illustrates scales of the dial-indicating type embodying my invention.

As shown in the drawings, my invention embodies a dial-scale indicating the price of the article in money values, a pointer rotating upon such dial-scale, a mechanism for operating said money-indicating pointer, and a mechanism to control and regulate the relation of the weight-pointer to the money-pointer, whereby the price of any article per pound being indicated its weight and total cost are indicated at once by dials which indicate the weight and cost.

Referring to the drawings, Figure 1 represents in front elevation a weighing and price scales embodying my invention. Fig. 2 is a similar view, the weight and cost dials being removed to show the mechanism for operating the pointers of such dials. Fig. 3 is a vertical central cross-section on the line $y\ y$ of Fig. 1, and Fig. 4 is a horizontal section on the line $x\ x$ of Fig. 1. Figs. 5 and 6 are views in different positions of the coacting toothed slotted sectors which actuate the weight and cost pointers. Fig. 7 is a partial sectional view showing the relation of the coacting toothed slotted sectors and an adjusting-screw connected therewith. Fig. 8 is a sectional detail showing the universal-joint connection of the adjusting-screw with its short operating-shaft, and Fig. 9 is a sectional detail showing the relation and connection of the adjusting-screw with the toothed slotted sectors. Fig. 10 shows in enlarged elevation the toothed slotted sectors and their connecting mechanism, and Fig. 11 is a vertical cross-section of the same. Fig. 12 is a vertical cross-section of a weighing and price scales embodying my invention in a modified form, and Fig. 13 is a vertical longitudinal section of Fig. 12.

Referring now to Figs. 1 to 11, inclusive, of the drawings as illustrating one embodiment of my invention, the case which incloses the indicating mechanism is composed of a casing, preferably of a back $a$ and a face B, each provided with abutting-bosses and secured together by screws $u$, as in Fig. 4. These parts are of sheet iron or brass pressed or stamped to the desired form.

To the back plate are riveted an inward centrally-standing boss or hub $a'$ and the bosses $r$, $s$ and $t$, for purposes which I shall presently state, and at its periphery there is an arc-formed scale A, the divisions of which indicate the price per pound of the article to be weighed, and, as shown, stand from one to twenty cents per pound. The face-plate has two concentric scales, the inner one of which represents pounds or other units of weight and fractional divisions thereof, and the outer scale represents dollars or other units of money value and fractional divisions thereof for indicating both the weight and cost of the article to be weighed.

The platform P has a yoke Y, which, by a vertical central extension, passes into the casing and terminates in a cross-head C, suitably mounted between guides C' C', Fig. 10, and said cross-head has connected to each end a coiled spring D, which, rising therefrom, is connected to the ends of a cross-bar $e$, which latter is adapted to ride upon said guides, as seen in Figs. 2 and 3, and is itself secured to the upper side of the back casing-plate by screws $d\ d$, placed coincident with the springs, and passing up through openings in said back plate are secured by nuts N at the outer side of said plate, so that by adjusting these nuts the tension of the springs may be equally increased or diminished and the scale adjusted to give the proper balance to the platform. The platform and its yoke-connected cross-head are by this construction suspended and balanced by the adjustable springs, screws, and nuts.

Within bearings in the central hub $a'$ and in the face-plate B is fitted a short shaft $k$, which projects beyond said face-plate and has a pointer $k'$ fixed on its outer end to indicate upon the weight-scale the pounds of the article being weighed, and said shaft has a pinion K on its inner end. A toothed sector-plate E is mounted upon the case-boss $r$ so as to engage with the said pinion K, and at its toothed end is pivotally connected to the platform cross-head by a link M, (better seen in Fig. 10,) so that the movement of the platform is communicated to said toothed sector-plate and by it to the pinion K and to the weight-indicating pointer. This toothed sector-plate has a slot which stands radial to its boss-bearing pivot $r$, the purpose of which I will presently state.

A sleeve $l$ is fitted loosely upon the shaft $k$ between its pinion K and the pointer $k'$, and has a pinion L adjacent to the pinion K and a pointer $l'$ fixed on its outer end to indicate upon the cost or money-value scale the price of the article being weighed, as I will presently state.

A toothed sector-plate F is mounted upon the case-boss $s$, so as to engage with the said sleeve-pinion L, and is connected at its toothed end to the toothed sector-plate E in such manner by a slotted arm F' that the movement of the said sector-plate E is communicated to the toothed sector-plate F, and by it to the sleeve-pinion and to the cost-indicating pointer. The sector-plate F is slotted to surround the sleeve-pinion, and its slotted arm F' is extended so as to lap with the slotted sector-plate E, and these toothed sector-plates are pivotally mounted on opposite sides of the central shaft, so that when the balance is at rest the slots in these sector-plates will be coincident in a horizontal plane, as in Figs. 2 and 10. A screw-threaded stem I is placed between the sector-plates, and is mounted in a boss at the inner end of the sector-plate E, and at its outer end is connected by a ball-and-socket joint or flexible connection with the inner end of a short shaft O, as in Figs. 8 and 9, which shaft is fitted in a bearing in the case-boss $t$ and carries at its outer end a pinion $h$, the purpose of which I will presently state. This screw passes through a nut $i^2$, placed upon it between its bearings, and has two oppositely-projecting arms or pins $i$ $i$, which enter and are free to slide within the slots of the lapping toothed sector-plates, as seen in Figs. 5, 6, 7, and 9, whereby when the screw is caused to rotate by means which I shall presently describe the pins or arms of the nut will be caused to travel in the slots of the toothed sectors and indicate upon the weight-scale the changes produced by the action of the springs.

A segmental rack-plate G is mounted upon the central boss or hub $a'$ against the inner side of the back case-plate, so that the rack $g^2$ at its outer edge will engage with the pinion $h$ on the short screw-connected shaft. This rack-plate has a handle end $g$, which extends through a slot $v$, Fig. 11, by which it is turned upon its hub-bearing $a'$, and when so turned moves with the segmental rack $g^2$, and thereby causes the pinion $h$ to rotate to operate the sector-plates by the screw-nut in the way described. In this movement the said handle is set upon the price-scale to the number which will indicate the price per pound of the article to be weighed, and the position of this handle when the scales are at rest is at the unit-mark 1 upon the price-scale, the screw-nut of the sector-plate E is at the outer limit of its movement, and therefore farthest removed from the pivot-bearing of the sector-plate F, and the weight being placed upon the platform P the cross-head is drawn down thereby, and through the link M the sector E is rotated upon its pivot-bearing $r$, and the pinion K is rotated through a portion of one revolution equal to the weight upon the platform. At the same time the sector-plate F is rotated through a portion of a revolution, which is regulated by the arm or pin $i$ of the screw-nut $i^2$, and transmits through the pinion L and the pointer $l'$ an indication upon the money-value scale, which has a relation to the indication upon the weight-scale, this relation being fixed or determined by the position of the nut arms or pins in the slots of the sector-plates.

When the segment-rack G is rotated by means of its handle-arm $g$, the toothed rack $g^2$, engaging the pinion $h$, revolves said pinion, and with it the screw I, and the relation of the arc through which the sector-plates move is changed and the motion imparted to the pointers $l'$ $k'$ changed proportionally. A screw having one-eighth of an inch pitch will be revolved once for each division on the price-scale; but it is evident that the proportions may be varied to suit the size of the scales.

Figs. 12 and 13 show my invention as applied to the lever type of scales with two opposite scale-indicating faces, and in such construction the pinion K is fixed upon the central shaft between the sector-plates, and a sleeved pinion L L² is fitted upon said shaft on each side of the said pinion K, and an additional sector-plate F² is engaged with the additional sleeved pinion L², and is secured to the sector-plate F so that it will rotate with that sector-plate.

It is evident that immaterial departures may be permitted from the general construction and arrangement of parts contributing toward my invention, and for this reason I do not wish to be understood as limiting myself thereto in precise detail.

Referring to the universal ball-joint connection of the screw I with its operating-shaft, it will be understood that, while such connection must permit the free swinging movement of the screw with the toothed sector-plate E under the weight upon the platform, such ball-joint connection must by a feather and groove also provide for positively rotating the screw by the shaft O to change the relative position of the armed nut $i^3$ with both said toothed sector-plates, as shown in Fig. 8.

In the operation of scales of the construction shown, assuming the price of any given article to be seven and one-half cents per pound, the segment-rack G is rotated by means of the projection $g$ until the center of the opening $g^5$ therein is half-way between the figures 7 and 8 on the indicator-arc A. The relation of leverage is there changed, so that while the pinion actuating the weight-pointer makes a complete revolution, the pinion which actuates the price-pointer makes fifteen-fortieths of a revolution. If now a given quantity of the given article is placed upon the platform, its weight will be indicated by the partial rotation of the weight-pointer, and at the same time the price-pointer will rotate fifteen-fortieths of the space rotated by the weight-pinion and indicate the price or cost at the required cost per pound. Assuming that sugar at six and one-half cents per pound is called for, the customer demanding one dollar's worth, the indicator being set at 6½ cents of the arc, the weight-pointer will indicate $15\tfrac{5}{13}$ pounds when the price-pointer points to $1.00.

The change in relation of leverage may be effected by increasing the size or diameter of one of the pinions L or K where great range of changes are demanded; but the form shown is approved because it is simple and of a form easily constructed and understood.

Having thus described a scale embodying in preferred forms all the several features of my invention, what I separately claim, and desire to secure by Letters Patent, is the following:

1. In a combined weighing and price scale, the combination, with the counterbalanced weight-receiving platform, a dial provided with a weight-indicating and a money-value scale, and pointers adapted to travel over the respective weight-indicating and money-value graduations, of two sectors pivotally supported at their opposite ends and having overlapping portions, each sector having connection with and constructed to control the movements of its respective pointer, and one of the sectors having connection with the said weight receiving platform, and a connection between the overlapping portions of the sectors, whereby a movement of one is transmitted to the other, substantially as described, for the purpose specified.

2. In a combined weighing and price scale, the combination, with the counterbalanced weight-receiving platform, a dial provided with a weight and a money-value indicating scale, and pointers constructed to travel over the said weight and money-value graduations, respectively, of two sectors connected with and adapted to control the movements of the respective pointers, one of the sectors having connection with the said weight-receiving platform, and a variable connection between the sectors to govern the relative movements of the pointers, substantially as set forth.

3. The combination, with the counterbalanced weight-receiving platform, a dial having a money-value and a weight indicating scale, and pointers adapted to travel over the respective scales, of two sectors, each having connection with and adapted to control the movements of the respective pointers, a connection between one of the sectors and the weight-receiving platform, a connection between the sectors, and mechanism for positively and properly adjusting the connection between the sectors, whereby the relative movement of the aforesaid pointers can be regulated according to a predetermined scale, substantially as set forth.

4. The combination, with the counterbalanced weight-receiving platform, a dial provided with a money-value and a weight indicating scale, pointers constructed to travel over the said respective scales, and two sectors, one having connection with the weight-receiving platform and each having connection with and constructed to control the movements of its respective pointer, of a connection between the sectors, an adjusting device for moving the said connection, and an arm adapted to move over a graduated arc and having a portion thereof constructed to engage with the said adjusting device and operate the same to change the position of the said connection between the sectors, substantially as set forth, for the purpose described.

5. The combination, with the counterbalanced weight-receiving platform, pointers for indicating the money-value and weight on suitable scales, two sectors for controlling the movements of the pointers, respectively, and a connection between the sectors, of a feed-screw having engagement with the said connection, a graduated arc, and an arm concentric with the arc and having a segment which is adapted to engage with and effect a movement of the said feed-screw, substantially as described, for the purpose specified.

6. The combination, with the counterbalanced weight-receiving platform, pointers for indicating the weight and the money-value on suitably-graduated scales, and two sectors having engagement with and adapted to control the movements of the respective pointers, one of the sectors having connection with the weight-receiving platform, of a connection between the sectors, a feed-screw journaled at its inner end to one of the sectors, a short shaft journaled in a bearing near the pivot-support of the said sector and having a ball-and-socket connection with the outer end of the feed-screw, and provisions, as the cog-segment and pinion, for engaging with and rotating the said short shaft, substantially as set forth.

7. The combination, with the counterbalanced weight-receiving platform, weight and money-value indicating scales, pointers adapted to move over the respective scales, and two sectors, one having connection with the weight-receiving platform, and each having connection with and adapted to operate its respective pointer, of a connection between the sectors, a feed-screw having attachment with the said connection, a short shaft having a pinion and having attachment with the said feed-screw, and a toothed segment meshing with the said pinion and having an arm by which it is operated, said arm moving over a graduated arc, substantially as set forth.

8. The combination, with the counterbalanced weight-receiving platform, a dial provided with a money-value and a weight indicating scale, and two sectors pivotally supported at their opposite ends and constructed to operate and move pointers over the respective weight and money-value graduations, and having overlapping portions that are provided with slots, one of said sectors being in connection with the weight-receiving platform, of a connection between the sectors, having its ends projected into the said slots therein, and instrumentalities for moving the said connection in the said slots in the sectors according to a predetermined scale, whereby the relative movement of the pointers over the money-value and weight indicating graduations can be varied, as required, substantially as described, for the purpose specified.

9. The combination, with the case provided with a money-value and a weight indicating scale, a shaft having a pointer on its outer end and a pinion on its inner portion, a boss or sleeve mounted on the shaft and having a pinion on its inner end and a pointer on its outer end, the pointers being arranged to travel over the respective scales, and a counterbalanced weight-receiving platform, of two sectors pivoted at their opposite ends and having engagement with the respective pinions, one of the sectors having connection with the said weight-receiving platform, and the said sectors having overlapping portions, which are slotted, and a connection between the sectors, having portions projected into the slots in the said sectors, the said connection being adjustable between the sectors, substantially as described, for the purpose specified.

10. The combination of the case having a stud $a'$ projecting inward from its back plate, and having a money-value and a weight indicating set of graduations on its face, a shaft stepped in said stud and projected through the face and having a pointer on its outer end and having a pinion on its inner end, a boss or sleeve mounted on the said shaft and having a pinion on its inner end and a pointer on its outer end, a counterbalanced weight-receiving platform, two sectors, one having engagement with the said weight-receiving platform, and each meshing with its respective pinion, the sectors having overlapping portions that are slotted, a connection between the overlapping portions, having portions projected into the slots therein, a feed-screw, a toothed segment mounted on the stud $a'$ and meshing with the feed-screw, and having an arm, and a graduated arc for the arm of the toothed segment to move over, substantially as described, for the purpose specified.

11. The combination, with two oppositely-disposed dials, each having a money-value and a weight indicating scale, two sets of pointers, one set for each dial, and a counterbalanced weight-receiving platform, of three sectors, the middle sector having connection with the weight-receiving platform and adapted to directly control the movements of corresponding pointers on the dials, the outer sectors having independent attachment with the other pointer on the dial, and a variable connection between the middle and the side sectors, substantially as described, for the purpose specified.

12. In weighing and price scales, the combination of concentric dial-scales indicating the weight, the cost, and the price, indicators therefor, a counterbalanced weight-receiving platform substantially such as described for connecting the weight and cost indicators with said platform, and mechanism substantially such as described for connecting the price-indicator with the said weight and cost connecting indicators, for the purpose stated.

13. In weighing and price scales, the combination of concentric dial-scales indicating the weight, the cost, and the price, indicators therefor, a counterbalanced weight-receiving platform, mechanism substantially such as described for connecting the weight and cost indicators with said platform, mechanism substantially such as described for connecting the price-indicator with said weight and cost indicators, and mechanism substantially such as described whereby the relations of the weight and cost indicators can be fixed, changed, and regulated, for the purpose stated.

14. In a weighing and price scales, the combination of concentric dial-scales indicating the weight, cost, and the price, a counterbalanced platform, the indicators $k'$ and $l'$, their actuating-pinions K and L, the toothed and slotted sectors E and F, the screw I, the nut $i^2$, having the arms $i$ in the slots of said sectors and engaging said nut, the socket-shaft O, connecting said screw, the pinion $h$ on said socket-shaft, and the segment-rack G $g^2$, engaging said pinion and having the indicator for the price-scale, the said slotted sector E having a pivoted connection with the said platform, for operating in the way described.

15. The combination of the counterbalanced platform, dial-scales indicating the weight, cost, and the price, indicators therefor, and a device for connecting these indicators for operation in the way described, consisting of the slotted toothed sectors E and F, the pinions K and L, the screw I, the nut $i^2$, engaging said screw and the slots of said sectors, the shaft O, having the pinion $h$, a ball-and-socket connection for said screw and shaft, the link M, and the segment-rack G $g^2$, engaging said pinion, substantially as described.

16. The combination of a counterbalanced platform, a dial-scale indicating the weight, cost, and price of the article in money-values, weight, and costs, pointers rotating upon such dial-scale, mechanism for operating said pointers, mechanism to control and regulate the relation of the weight-pointer to the cost-pointer, the price-scale A, the segmental rack $g^2$ and indicator $g^5$, and the pinion $h$, connecting and operating said controlling and regulating mechanism in the way described, and the link M, connecting said platform with the rotating pointers and their controlling and regulating mechanism.

17. In weighing and price scales, the central shaft $k$, the fixed and loose pinions K L thereon, the pointers $k'$ $l'$, the toothed sectors engaging said pinions, pivoted upon fixed studs $r$ $s$ and having radial slots in lapping relation to each other, the screw I, arranged between the slotted sector parts and pivotally mounted in the sector E, the nut $i^2$, engaging said screw and the slots of said sectors, the shaft O, mounted in the fixed stud $t$ and having the pinion $h$ and connected by ball-joint with said screw, the toothed segment $g^2$, mounted upon the fixed boss $a'$ and having the indicator $g^5$, the counterbalanced platform, the link M, connecting it with the sector E, and the weight, cost, and price indicating dial scales, for operation as described.

In testimony whereof I have hereunto set my hand in the presence of two subscribing witnesses.

JOHN WOODRUFF CULMER.

Witnesses:
W. K. HARRIS,
E. H. CAREY.